United States Patent [19]

Imamura

[11] Patent Number: 5,142,729
[45] Date of Patent: Sep. 1, 1992

[54] WINDSHIELD WIPER APPARATUS INCLUDING RISE-UP MECHANISM

[75] Inventor: Shinji Imamura, Kosai, Japan

[73] Assignee: Asmo Co., Ltd., Shizuoka, Japan

[21] Appl. No.: 600,824

[22] Filed: Oct. 22, 1990

[30] Foreign Application Priority Data

Oct. 23, 1989 [JP] Japan ................... 1-275597
Mar. 12, 1990 [JP] Japan ................... 2-60730

[51] Int. Cl.$^5$ .............................................. B60S 1/06
[52] U.S. Cl. ............................. 15/250.16; 15/250.13; 15/250.30; 74/43; 74/51; 74/42
[58] Field of Search ........... 15/250.13, 250.16, 250.17, 15/250.21, 250.23, 250.30, 250.27, 250.39; 74/43, 51, 829, 42

[56] References Cited

U.S. PATENT DOCUMENTS

| 2,298,197 | 10/1942 | Coffey | 15/250.13 |
|---|---|---|---|
| 3,570,039 | 3/1971 | Ichinose et al. | 15/250.13 |
| 4,466,153 | 8/1984 | Seibicke | 15/250.16 |
| 4,642,838 | 2/1987 | Fuzita et al. | 15/250.21 |
| 4,765,018 | 8/1988 | Buchanan, Jr. | 15/250.13 |
| 4,787,114 | 11/1988 | Okudaira | 15/250.13 |
| 4,947,507 | 8/1990 | Naiki | 15/250.27 |

FOREIGN PATENT DOCUMENTS

| 0094521 | 11/1983 | European Pat. Off. . | |
|---|---|---|---|
| 3405677 | 8/1984 | Fed. Rep. of Germany | 15/250.21 |
| 1137163 | 5/1957 | France . | |

Primary Examiner—Harvey C. Hornsby
Assistant Examiner—Gary Graham
Attorney, Agent, or Firm—Venable, Baetjer, Howard & Civiletti

[57] ABSTRACT

A windshield wiper apparatus for a vehicle having a pivot lever, a linkage, and a rotating mechanism which is operative to move windshield wipers to and from storage and operating positions is provided. The pivot lever is secured at an end thereof to a pivot shaft which supports a wiper arm, and is coupled at the other end thereof to a link rod connected to a wiper motor which pivotally drives the wiper arm. The linkage includes a first link which is coaxially connected to the pivot shaft, a second link which is connected to the link rod and is substantially parallel to the first link, and a third link which is connected at an end thereof to the first link and connected at the other end thereof to the second link and the link rod to reciprocally rotate the pivot shaft. The rotating mechanism is interlocked to the first link to hold the first link at a predetermined wiping position during the normal operation of the wiper and to rotate the first link to a predetermined storage position when the wiper is not in use.

21 Claims, 12 Drawing Sheets

F I G. 11(A)  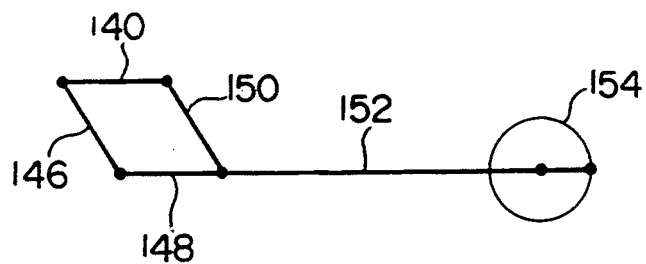
F I G. 11(B)  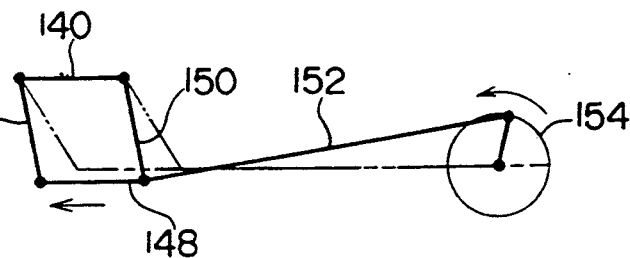
F I G. 11(C)  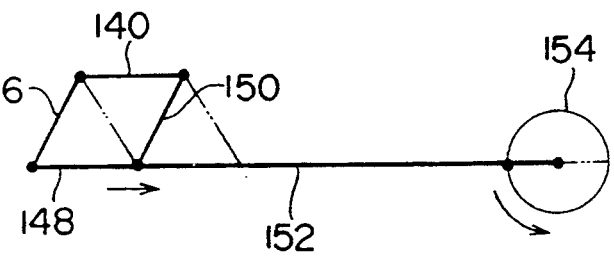

WINDSHIELD WIPER APPARATUS INCLUDING RISE-UP MECHANISM

BACKGROUND OF THE INVENTION

1. Field of the Invention

The present invention relates to a windshield wiper apparatus for a vehicle, and more particularly to a windshield wiper apparatus for a vehicle equipped with a rise-up mechanism for moving a wiper arm and a blade further downwardly of their lower reversing position so as to stop and accommodate the same.

2. Description of the Related Art

Among the types of windshield wiper apparatus for vehicles, a type is known which is equipped with a so-called rise-up mechanism whereby a wiper arm and a blade are moved further downwardly of their lower reversing position and stopped in order to be accommodated in a cowl box disposed below a lower end of a windshield at the time of stopping the wiper apparatus.

With the windshield wiper apparatus of this type, the wiper arm and blade are rotatably supported by a pivot shaft, and a pivot lever is secured to the pivot shaft. A link rod connected to a crank arm of a wiper motor is connected to the pivot lever, and the driving force of the wiper motor is arranged to be transmitted to the pivot lever by means of the link rod.

During the normal operation of the wiper apparatus, the torque of the wiper motor is transmitted to the pivot lever via the link rod, whereby the pivot shaft is reciprocally rotated so as to cause the wiper arm and blade to rotate reciprocally. Meanwhile, when the wiper arm and blade are to be stored, by changing the effective pitch of the crank arm of the wiper motor by the use of an eccentric pin and an eccentric shaft or the retraction and extension of the crank arm, or by changing the angle of rotation of the crank arm of the wiper motor by controlling the wiper motor itself, the pivot lever is moved further by a predetermined angle than at the time of the normal operation, thereby moving the wiper arm and blade further downwardly of their lower reversing position to a retracted position to stop and store the same.

However, with the conventional wiper apparatus equipped with such a conventional rise-up mechanism, the mechanisms of the eccentric pin, the eccentric shaft, etc., for causing the wiper arm and blade to be retracted for stopping and storage are complicated, and special components such as a motor controller and a rotation angle detecting sensor have been essential. For this reason, the overall cost of the apparatus has been high, and there has been a drawback in that a general motor cannot be used as a wiper motor.

SUMMARY OF THE INVENTION

Accordingly, the present invention has been devised in view of the above-described circumstances and has as its object to provide a windshield wiper apparatus for a vehicle which has a simple structure and can be produced at low cost and which is capable of storing and stopping a wiper arm and a blade in a retracted position.

To this end, in accordance with one aspect of the present invention there is provided a windshield wiper apparatus for a vehicle in which a pivot lever one end of which is secured to a pivot shaft for rotatably supporting a wiper arm and is adapted to rotate the pivot shaft is reciprocally rotated by a link rod connected to a wiper motor so as to reciprocally rotate the wiper arm, the windshield wiper apparatus for a vehicle comprising: a first link one end of which is connected coaxially with the pivot shaft in such a manner as to be rotatable relative to the pivot shaft; a second link opposed to the first link in a substantially parallel state therewith and having one end connected to the other end of the pivot lever and the other end connected to the link rod; a third link rod opposed to the first link in a substantially parallel state therewith and having one end connected to the other end of the first link and the other end connected to connecting portions of the second link and the first link rod; and a rotating mechanism operative at a time of storage which is adapted to hold the first link at a predetermined position at the time of the normal operation of the wiper apparatus, i.e., during a wiping operation of the wiper apparatus, and rotate the first link by a predetermined amount at the time of stopping and storage of the wiper arm.

With the windshield wiper apparatus for a vehicle arranged as described above, the first link and the second link are opposed to each other in a substantially parallel state, while the pivot lever and the third link are opposed to each other in a substantially parallel state, so that the first to third links and the pivot lever constitute a parallel link mechanism as a whole.

During the normal operation of the wiper apparatus, the first link is held by the rotating means operative at a time of storage and is set in an immovable state. At this juncture, upon the actuation of the wiper motor, the torque of the wiper motor is transmitted to the pivot lever via the link rod and the second link, which in turn causes the pivot shaft to rotate reciprocally, thereby reciprocally rotating the wiper arm.

In this case, since the first link is immovable, the second link and the link rod are held by the third link, and the third link move substantially parallel with the pivot lever, thereby allowing the torque of the link rod to be positively transmitted to the pivot lever.

Meanwhile, at the time when the wiper arm and blade are to be stopped and stored, the first link is rotated by a predetermined amount by the rotating means operative at a time of storage. Consequently, the third link connected to the first link and the second link connected to the third link move as they are connected to the link rod. Hence, the pivot lever is rotated via the two links by an angle corresponding to the amount of rotation of the first link. Accordingly, the pivot shaft to which the pivot lever is secured is rotated to move the wiper arm, thereby allowing the wiper arm and blade to be moved further downwardly of their lower reversing position so as to be stopped and stored at a retracted position.

Thus, by virtue of a simple mechanism comprising the first to third links, the wiper arm and blade can be retracted so as to be stopped and stored, thereby making it possible to effect a reduction in costs. In addition, the wiper motor need not be any special motor and can be realized by using an ordinary motor.

In accordance with another aspect of the invention, the vehicle wiper apparatus for a vehicle may further comprise: a drive arm for rotatably supporting the first wiper arm and adapted to be reciprocally rotated integrally with the pivot shaft by being secured thereto; a pivot shaft gear disposed coaxially with and rotatably relative to the pivot shaft; and means for transmitting torque in an opposite direction which is interposed between a rotating shaft of the first wiper arm and the pivot shaft gear so as to connect the two components, and is adapted to transmit the torque of the pivot shaft at a predetermined angle of rotation and as torque acting in an opposite direction, wherein the rotating shaft is displaced about the pivot shaft so as to apparently change the length of the first wiper arm, thereby expanding the wiping range of the wiper blade supported by the first wiper arm.

The above and other objects, features and advantages of the invention will become more apparent from the following detailed description of the invention when read in conjunction with the accompanying drawings.

BRIEF DESCRIPTION OF THE DRAWINGS

FIGS. 11A to 11C are diagrammatic views illustrating the operational relationship between the pivot lever and each link in accordance with the second embodiment.

DESCRIPTION OF THE PREFERRED EMBODIMENTS

Figure 1:
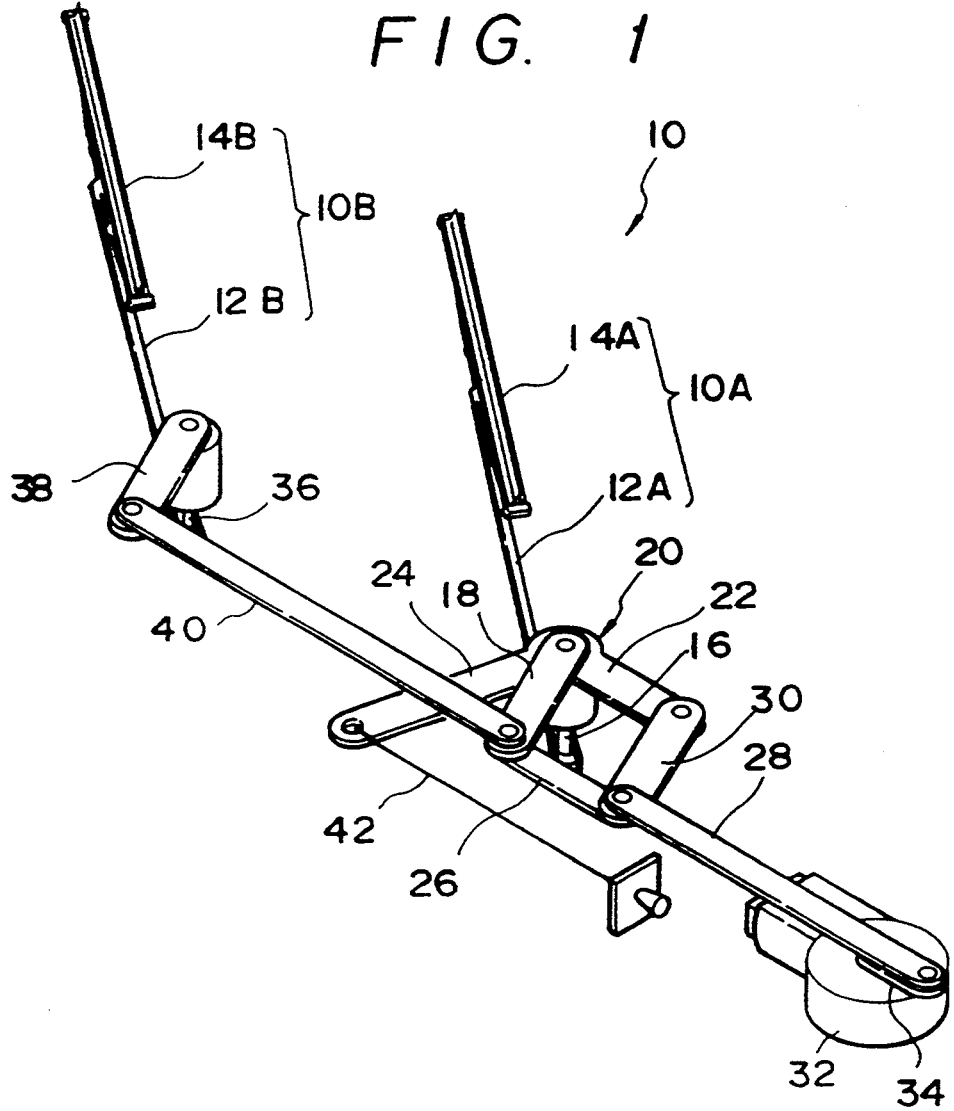
FIG. 1 is a perspective view illustrating an overall configuration of a windshield wiper apparatus for a vehicle in accordance with a first embodiment of the present invention.

FIG. 1 schematically illustrates an overall configuration of a windshield wiper apparatus 10 for a vehicle in accordance with a first embodiment of the present invention.

The wiper apparatus 10 is of a so-called parallel interlocked type comprising a right wiper 10A and a left wiper 10B which basically have the same construction. The right wiper 10A has a wiper arm 12A and a wiper blade 14A, and as the wiper arm 12A rotates reciprocally, the wiper blade 14A also rotates reciprocally, thereby wiping raindrops and the like attached to a windshield. In the same way as the right wiper 10A the left wiper 10B has a wiper arm 12B and a wiper blade 14B, and as the wiper arm 12B rotates reciprocally, the wiper blade 14B also rotates reciprocally, thereby wiping raindrops and the like attached to the windshield.

The wiper arm 12A of the right wiper 10A is secured to and rotatably supported by one end of a pivot shaft 16, whereby the wiper arm 12A and the wiper blade 14A are always adapted to rotate together with the pivot shaft 16.

Figure 2:
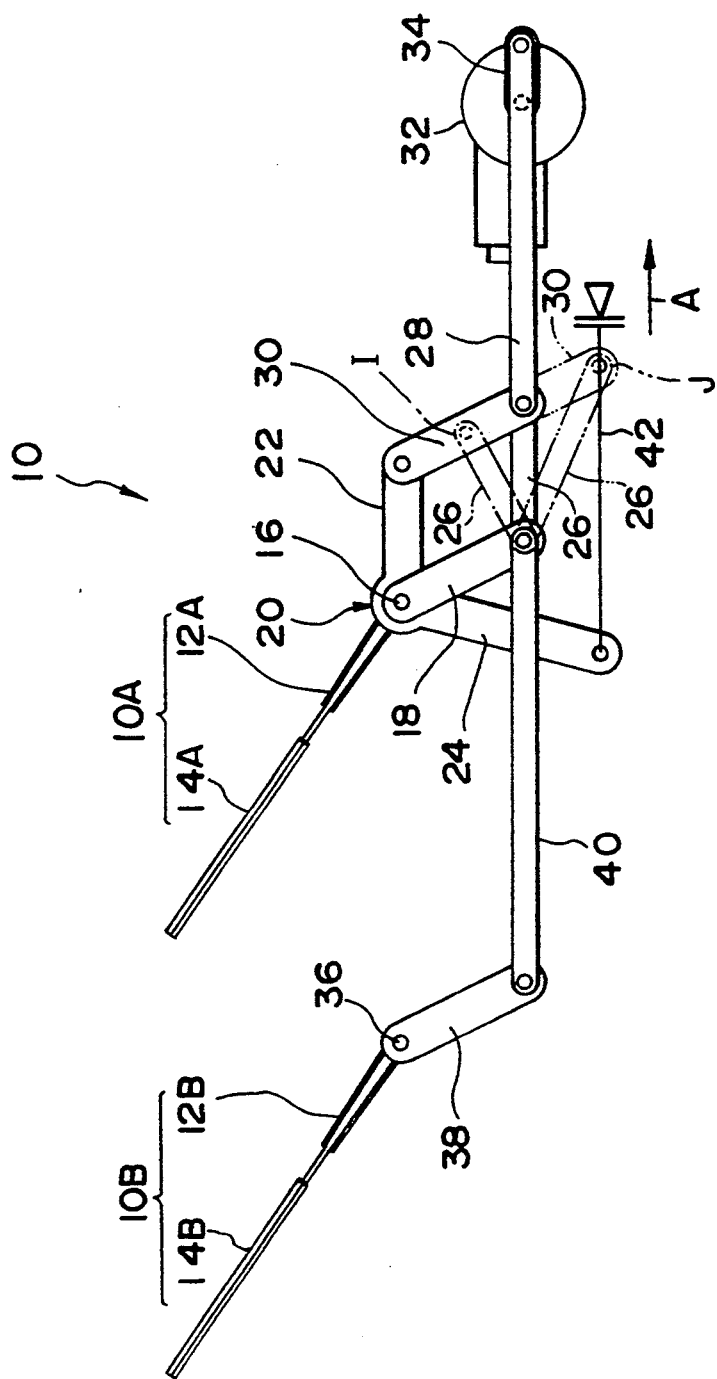
FIGS. 2 and 3 are plan views illustrating a state of linkage between a pivot lever and each link.
Figure 3:
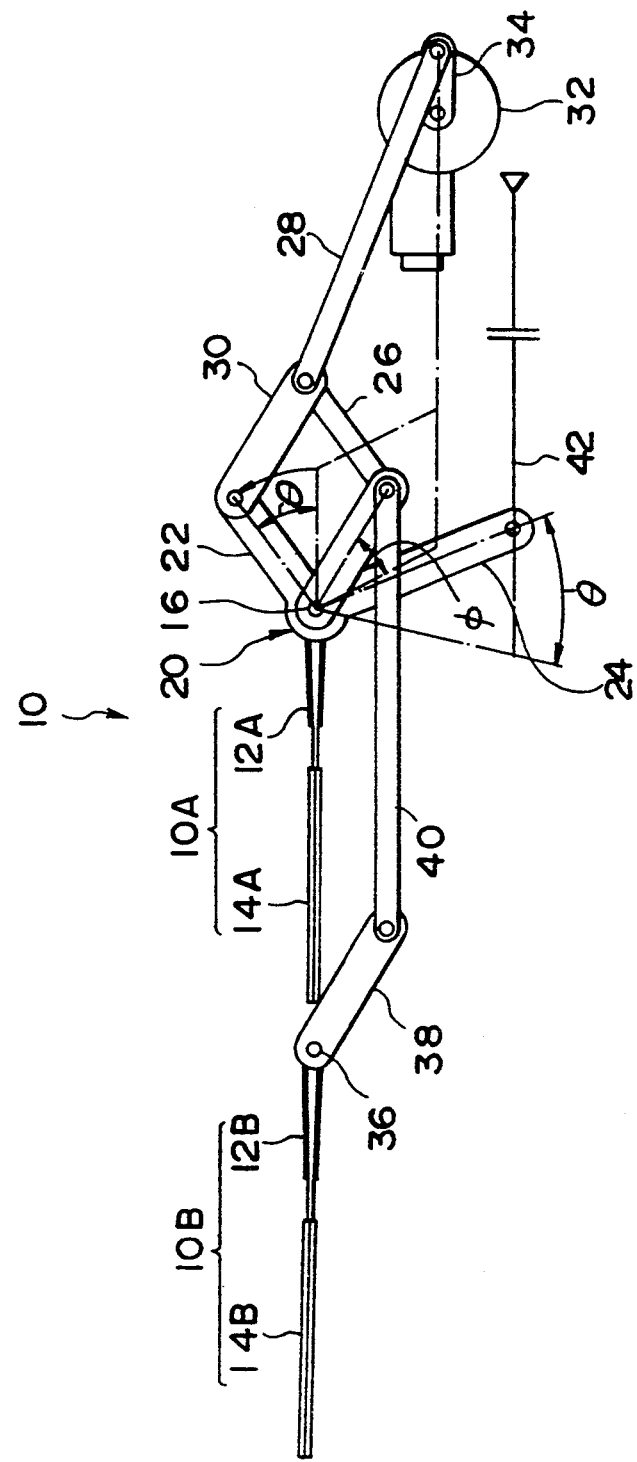

As is also shown in FIGS. 2 and 3, secured to the other end of the pivot shaft 16 is one end of a pivot lever 18. Consequently, as the pivot lever 18 is swung, it is possible to rotate the pivot shaft 16.

Meanwhile, the wiper arm 12B of the left wiper 10B is secured to and rotatably supported by one end of a pivot shaft 36, whereby the wiper arm 12B and the wiper blade 14B are always adapted to rotate together with the pivot shaft 36. In addition, secured to the other end of the pivot shaft 36 is one end of a pivot lever 38. Consequently, as the pivot lever 38 is swung, it is possible to rotate the pivot shaft 36.

The pivot lever 18 of the right wiper 10A and the pivot lever 38 of the left wiper 10B are connected to each other by means of a connecting rod 40. For this reason, the pivot levers 18 and 38, i.e., the pivot shafts 16 and 36 are always interlocked with each other.

A lever 20 is disposed around an outer periphery of the pivot shaft 16 of the right wiper 10A in such a manner as to be coaxial with the pivot shaft 16 and rotatable reiative to the same. .The lever 20 is formed with a link portion 22 serving as a first link, and a lever portion 24 extending at a predetermined angle (e.g., 120°) relative to the link portion 22 and constituting a part of rotating means operative at the time of storage. That is, both the link portion 22 and the lever portion 24 are capable of rotating relative to the pivot lever 18.

A link 26 serving as a second link has its one end connected to the other end (a portion for connection with the connecting rod 40) of the pivot lever 18 in such a manner as to oppose the link portion 22 of the lever 20. Furthermore, the other end of the link 26 is connected to one end of a link rod 28. Connected to a tip of the link portion 22 of the lever 20 is one end of a link 30 serving as a third link. The other end of the link 30 is connected to one end (a portion for connection with the link 26) of the link rod 28 with the link 30 opposed to the pivot lever 18.

The other end of the link rod 28 is connected to a crank arm 34 of a wiper motor 32. As a result, the torque of the wiper motor 32 is adapted to be transmitted to the links 30, 26 and the pivot lever 18 via the link rod 28.

As shown in FIG. 2, the pivot lever 18, the link portion 22 of the lever 20, and the links 26, 30 are provided with substantially the same length, and are connected in such a manner as to form a parallelogram as a whole, thereby constituting a so called parallel link mechanism. Furthermore, dimensions and the like of respective components are set in such a manner that the link 26 and the link rod 28 will be located on a straight line with the wiper motor 32 stopped.

Meanwhile, a rise-up lever 42 serving as a part of the rotating means operative at the time of storage is connected to a tip the lever portion 24 of the lever 20. The rise-up lever 42 normally holds the lever portion 24 at a predetermined position so as to set the lever 20 in an immovable state, and when the rise-up lever 42 is manually operated, the lever portion 24 can be swung. As a result, the link portion 22 of the lever 20 can be rotated about the pivot shaft 16 by a predetermined angle.

A description will now be given of the operation of this embodiment.

With the wiper apparatus 10 arranged as described above, as shown in FIGS. 2 and 4A, with the wiper apparatus stopped, the pivot lever 18, the link portion 22 of the lever 20, and the links 26, 30 are positioned in such a manner as to form a parallelogram as a whole, and the link 26 and the link rod 28 are aligned on a straight line.

Here, during the normal operation of the wiper apparatus, the lever portion 24 of the lever 20 is held at a predetermined position by the rise-up lever 42, and the lever 20 (the link portion 22) is kept in an immovable state.

Upon the actuation of the wiper motor 32, the crank arm 34 is rotated, and its torque is transmitted to the link 26 via the link rod 28, and is further transmitted to the pivot lever 18 via the link 26. As a result, the pivot shaft 16 is reciprocally rotated, which in turn causes the wiper arm 12A to be rotated reciprocally. At the same time, the torque of the wiper motor 32 transmitted to the link 26 is imparted to the pivot lever 38 via the connecting rod 40, with the result that the pivot shaft 36 is reciprocally rotated, so that the wiper arm 12B is also reciprocally rotated in synchronism with the wiper arm 12A.

Figure 4:
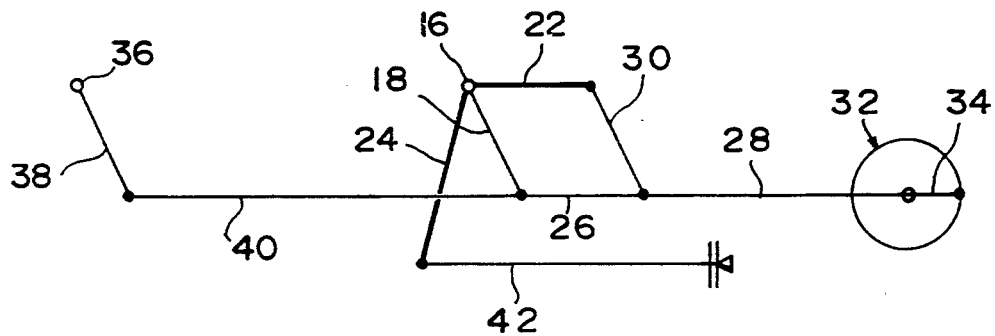
FIGS. 4A to 4D are diagrammatic views illustrating the operational relationship between the pivot lever and each link during the normal operation of the wiper.
Figure 4:
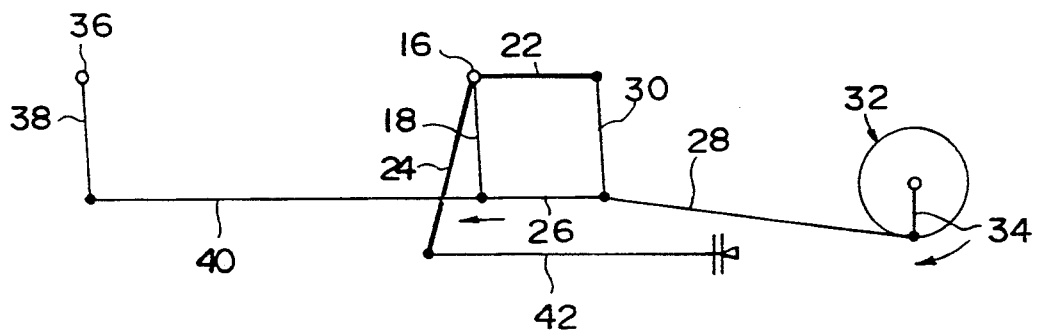

In this case, since the lever 20 is held by the rise-up lever 42, and the link portion 22 is immovable, as shown in FIG. 4B, while the link 26 and the link rod 28 are being held by the link 30, the link 30 moves while maintaining its parallel state with respect to the pivot lever 18, so that the rotating force of the link rod 28 is transmitted positively to the pivot lever 18. Similarly, the pivot lever 38 also moves while maintaining its parallel state with respect to the pivot lever 18, so that the rotating force is transmitted positively to the pivot lever 38.

Figure 4C:
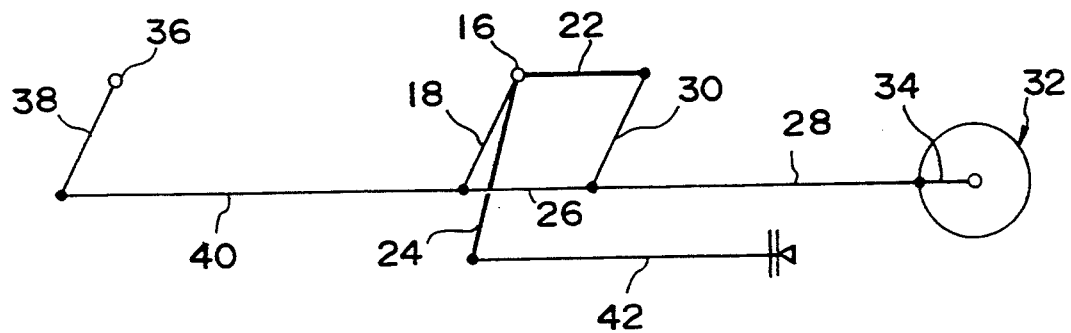
Figure 4D:
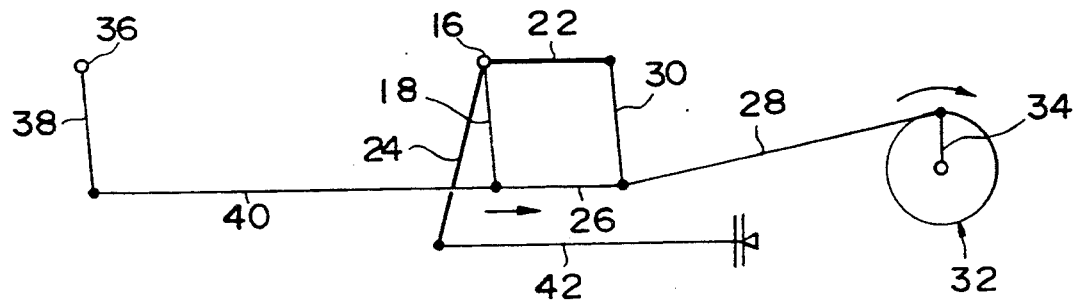

When the movements of the pivot levers 18 and 38 progress, and the crank arm 34 rotates by a half revolution, as shown in FIG. 4C, the pivot lever 18, the link 30, and the pivot lever 38 are reversed (in the state shown in FIG. 4D) and return to its original position. Subsequently, the aforementioned steps are repeated, thereby causing the pivot levers 18 and 38 to swing and the wiper arms 12A, 12B to rotate reciprocally.

Next, when it is desired to stop and accommodate the left and right wipers (the wiper arms 12A, 12B and the wiper blades 14A, 14B) by moving them further downwardly of their lower reversing position to a retracted position so as to accommodate the same in a cowl box (not shown) or the like located below a lower end of the windshield, the wiper motor 32 is stopped and the rise-up lever 42 is operated.

Figure 5:
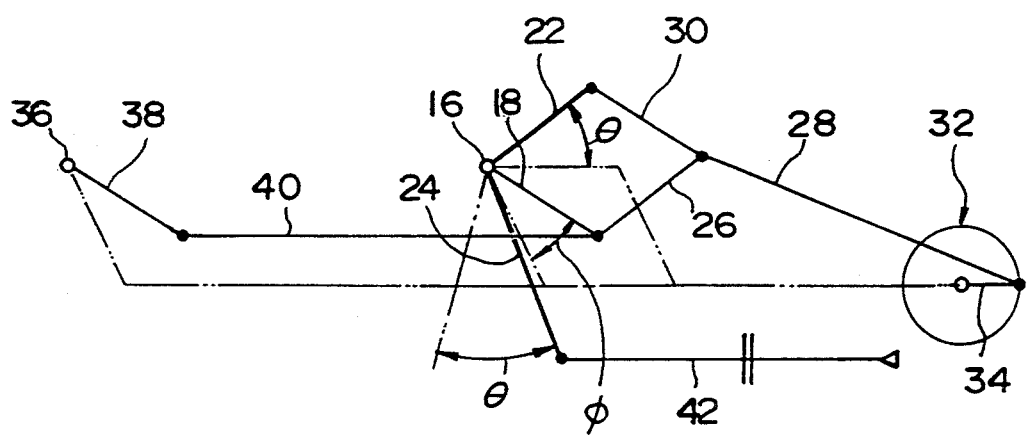
FIG. 5 is a diagrammatic view illustrating the operational relationship between the pivot lever and each link when the wiper apparatus is set in a retracted state.

When the rise-up lever 42 is pulled in the direction of arrow A shown in FIG. 2 by a manual operation or the like of a vehicle occupant, this tensile force is transmitted to the lever portion 24 of the lever 20, as shown in FIGS. 3 and 5. Consequently, the lever portion 24 is swung, which in turn causes the link portion 22 of the lever 20 to rotate about the pivot shaft 16 by an angle $\theta$.

At this point of time, since the wiper motor 32 is stopped, and the portion of the link rod 28 for connection with the crank arm 34 is in an immovable state, if the link portion 22 rotates about the pivot shaft 16, the link 30 connected to the link portion 22 and the link 26 connected to that link 30 are moved while being connected to the ink rod 28 and being held relative to each other. At this time, since the motor 32 is stopped with the crank arm 34 and the link rod aligned on a substantially straight line, the restraint of the link rod 28 in its swinging direction is held more firmly. In consequence, the pivot lever 18 is rotated via the two links by an angle $\phi$ corresponding to the angle $\theta$ of rotation of the link portion 22.

Accordingly, as the pivot shaft 16 to which the pivot lever 18 is secured is rotated, the wiper arm 12A is moved further downwardly of the lower reversing position to a retracted position for stopping and storage.

At the same time, as the pivot lever 18 is rotated by the angle $\phi$, the pivot lever 38 connected to the pivot lever 18 via the connecting rod 40 is similarly rotated. This causes the pivot shaft 36 to rotate and the wiper arm 12B to move downward to its retracted position.

An optimum rise-up angle of the wiper arms 12A and 12B, i.e., an optimum angle $\phi$ of rotation of the pivot levers 18, 38, corresponds to the angle $\theta$ of rotation of the link portion 22 of the lever 20, the angle $\theta$ of rotation of the link portion 22 of the lever 20 being determined by the rise-up lever 42. Accordingly, it suffices to set an appropriate rise up angle for the wiper arms 12A, 12B by setting the amount of operation (amount of tension) of the rise-up lever 42, as required. In addition, in cases where the amount of operation of the rise-up lever 42 is set to be fixed, it suffices to determine the dimensions of the respective portions of the pivot lever 18, lever 20 (lever portion 24 and link portion 22), links 26, 30, and link rod 28 in such a manner that the optimum angle $\phi$ of rotation of the pivot levers 18, 38 at the time of retraction of the wiper arms and blades becomes a desired angle corresponding to the angle $\theta$ of rotation of the link portion 22. Thus, the amount of movement (angle of rotation) of the wiper arms 12A, 12B at the time of their retraction can be set freely, so that the degree of freedom of design and the range of application to various types of vehicles can be expanded.

As described above, with the wiper apparatus 10, the wiper arms 12A, 12B can be stored and stopped by being retracted by virtue of a simple structure involving the lever 20 (lever portion 24 and link portion 22), and links 26, 30. In addition, the wiper motor 32 need not be any special motor and can be realized by using an ordinary motor. As a result, it is possible to effect a reduction in costs.

In this embodiment, although the arrangement provided is such that the rise-up lever 42 is used as a part of the rotating means operative at the time of storage, and is operated manually so as to rotate the link portion 22 of the lever 20 about the pivot shaft 16 by a predetermined angle, the present invention is not restricted to the same, and an arrangement may be provided such that the rise-up lever 42 is connected to an actuating source such as a motor, and the motor is actuated automatically at the time of retraction of the wiper arms and blades thereby to rotate the link portion 22 of the lever 20 by a predetermined angle. In this case, the operational efficiency is enhanced further.

In addition, in this embodiment, although a description has been given of the wiper apparatus 10 of the parallel interlocked type comprising the right wiper 10A and the left wiper 10B which have basically the same construction, the present invention is not restricted to the same, and may be applied to either the left or right wiper, or applied to the so-called one-arm wiper.

Although in this embodiment a description has been given of the wiper apparatus 10 in which the wiper arms 12A, 12B are secured to one ends of the pivot shafts 16, 36, respectively, and are hence adapted to rotate together with the pivot shafts 16, 36, the present invention is applicable to wiper apparatus having a different mechanism. For instance, the present invention is applicable to a retractable type wiper apparatus (which will be described in a second embodiment) in which a so-called gear train incorporating a planetary gear mechanism is interposed between a wiper arm and a pivot shaft, the gear train itself undergoes oscillatory movement, which in turn causes the wiper arm to rotate in the opposite direction, thereby expanding the wiping range into an elliptical shape. In cases where the present invention is applied to the retractable wiper apparatus of this type, since its torque is transmitted with the angle of rotation amplified by the aforementioned planetary gear mechanism, the amount of operation for rotating the pivot shaft by a predetermined angle at the time of retraction can be made small, which is more effective.

Furthermore, although the apparatus of this embodiment is used for storing the wiper arm and blade, it can be used as a wiper apparatus capable of being changed over between summer and winter by setting the lower reversing position of this embodiment at a further elevated position and setting the storing position at the lower reversing position. More specifically, the apparatus of the invention can be used as an apparatus capable of changing over the lower reversing position of the wiper apparatus during winter to the elevated position as compared with summer so as to prevent damage to the wiper apparatus due to the restriction of the lower reversing position of the wiper resulting from the snowfall during winter.

In addition, the connecting point between the second link 26 and the link 30 may be set at a position I indicated by the dotted line in FIG. 2. In this case, the wiping angle including the amount of movement for storage becomes smaller than in the case of the first embodiment. Alternatively, the connecting point between the second link 26 and the link 30 may be set at a position J indicated by the dot-dash line in FIG. 2. In this case, the wiping angle including the amount of movement for storage becomes greater than in the case of the first embodiment.

Figure 6:
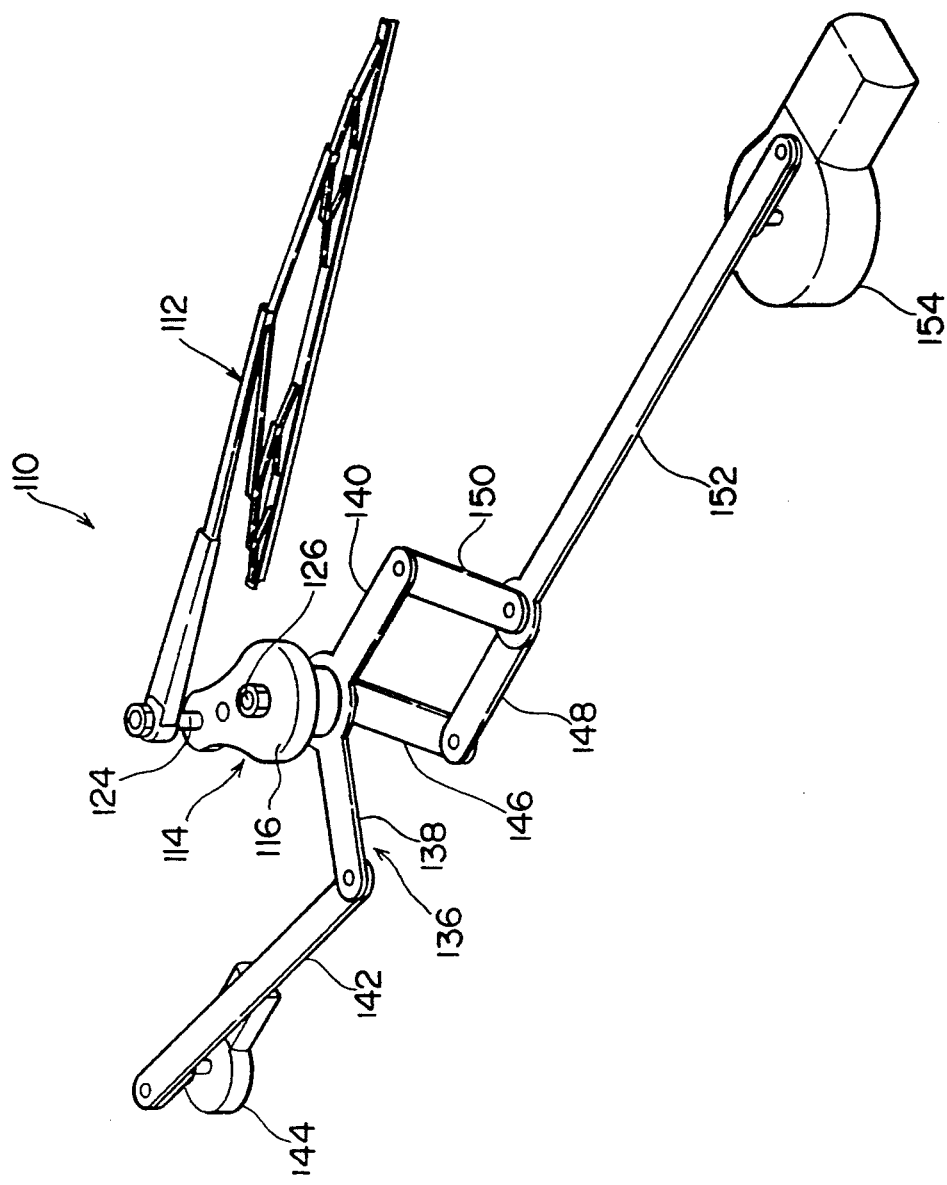
FIG. 6 is a perspective view illustrating an overall configuration of a windshield wiper apparatus for a vehicle in accordance with a second embodiment of the present invention.

FIG. 6 illustrates an overall perspective view of a windshield wiper apparatus 110 for a vehicle in accordance with a second embodiment of the present invention.

Figure 7:
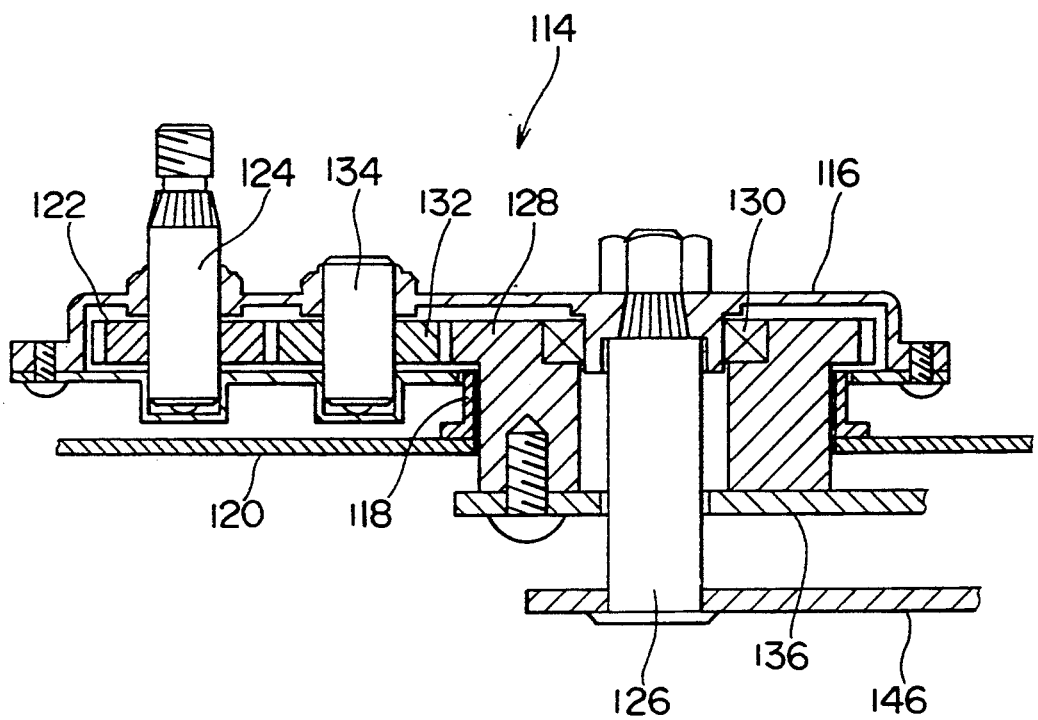
FIG. 7 is a cross-sectional view of a gear train in accordance with the second embodiment.

A wiper arm and blade 112 of the wiper 110 is rotatably supported by a gear train 114. As shown in detail in FIG. 7, the gear train 114 has a case 116 serving as a driving arm, and this case 116 is rotatably supported by a body 120 via a sleeve 118. At a distal end portion (an end portion away from the sleeve) of the gear train 114, an arm gear 122 constituting a part of a means for transmitting torque in an opposite direction is rotatably supported within a case 116 by a support shaft 124. The wiper arm and blade 112 is secured to a distal end portion of the support shaft 124, whereby the wiper arm and blade 112, together with the arm gear 122, is rotatable about the support shaft 124.

Meanwhile, a pivot shaft 126 is secured to the case 116 at the other end portion (located inwardly of the sleeve 118) of the gear train 114. The pivot shaft 126 is reciprocally rotated by being interlocked with a wiper motor 154 which will be described later, with the result that the case 116 of the gear train 114 is always adapted to rotate together with the pivot shaft 126.

A pivot shaft gear 128 is interposed between the pivot shaft 126 and the sleeve 118. The pivot shaft gear 128 is attached to the case 116 coaxially with the pivot shaft 126 via a bearing 130. For this reason, the pivot shaft gear 128 is rotatable relative to the pivot shaft 126 and the case 116.

An intermediate gear 132 constituting a principal part of the means for transmitting torque in an opposite direction is interposed between the pivot shaft gear 128 and the arm gear 122. The intermediate gear 132 is rotatably supported to the case 116 by a support shaft 134 and meshes with both the pivot shaft gear 128 and the arm gear 122 to couple the two members. Namely, the intermediate gear 132 serves as a planetary gear with respect to the pivot shaft gear 128. For this reason, for instance, if the pivot shaft 126, i.e., the case 116, rotates relative to the pivot shaft gear 128 with the pivot shaft gear 128 stopped, the intermediate gear 132 and the arm gear 122 both supported to the case 116 rotate as a result, so that the torque of the pivot shaft 126 is transmitted to the arm gear 122 via the intermediate gear 132 at a predetermined ratio of the angle of rotation and as torque acting in the opposite direction. On the other hand, if the pivot shaft gear 128 rotates relative to the pivot shaft 126, i.e., the case 116, with the pivot shaft 126, i.e., the case 116, stopped, the intermediate gear 132 meshing with the pivot shaft gear 128 rotates as a result, so that the torque of the pivot shaft gear 128 is transmitted to the arm gear 122 at a predetermined ratio of the angle of rotation and as torque acting in the same direction.

It should be noted that the gear ratio $\eta$ (i.e., the ratio of the angle of rotation) of the gear train 114 involving the pivot shaft gear 128, the intermediate gear 132, and the arm gear 122 is set to approximately 2-3 in this embodiment. Accordingly, the arrangement provided is such that the arm gear 122 rotates at an angle of rotation approximately two to three times that of the pivot shaft gear 128.

Figure 8:
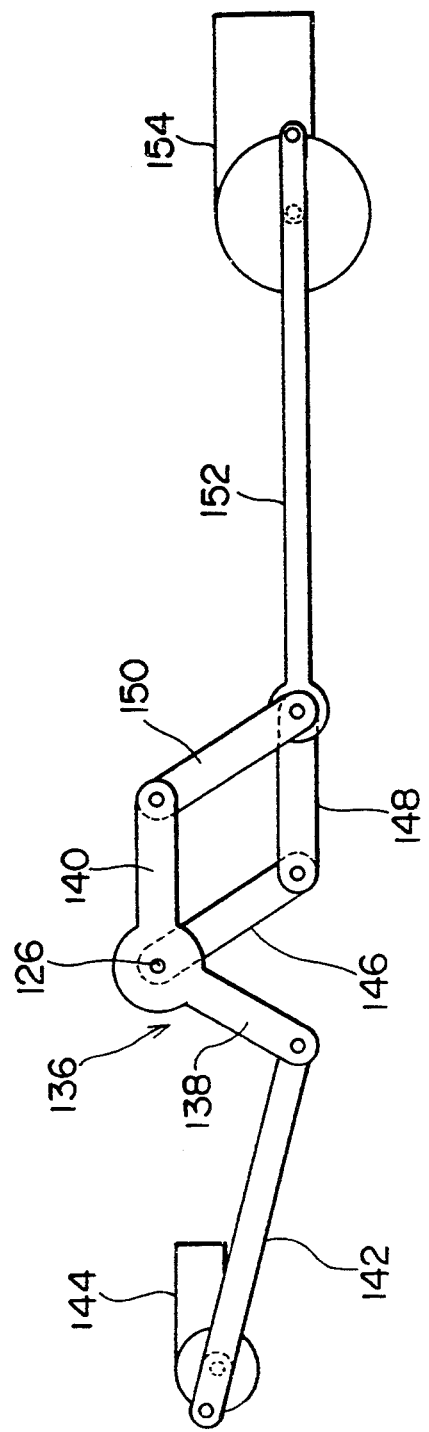
FIGS. 8 and 9 are plan views illustrating a state of linkage between a pivot lever and each link in accordance with the second embodiment.
Figure 9:
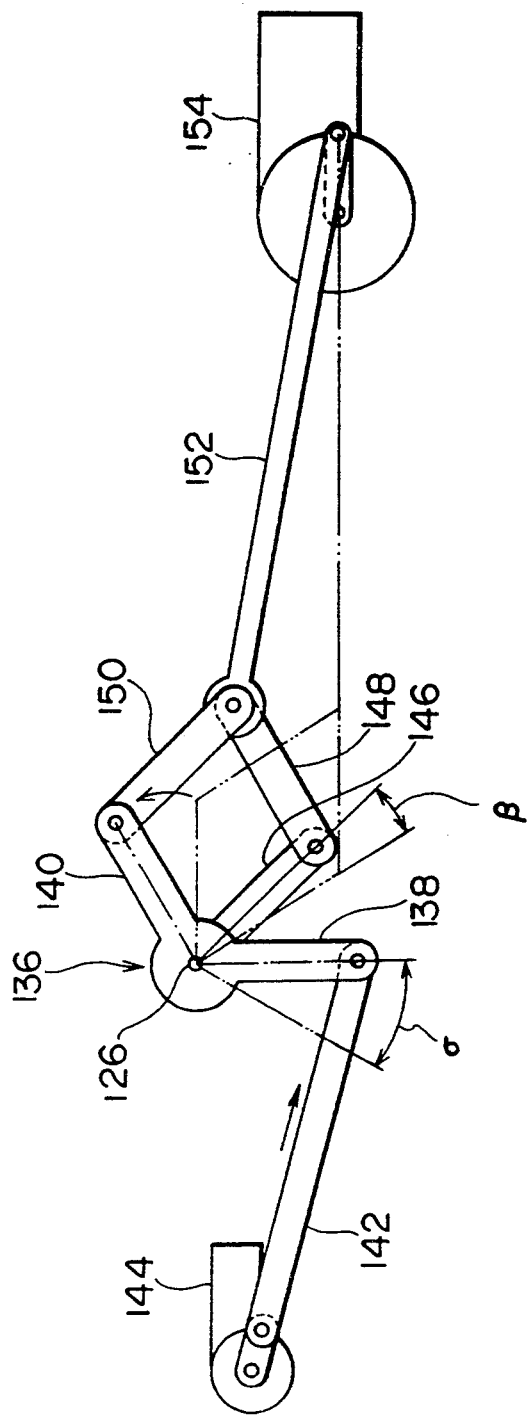

As is also shown in FIGS. 8 and 9, a lever 136 is secured to the pivot shaft gear 128. The lever 136 is formed with a lever portion 138 serving as a first lever and a lever portion 140 serving as a second lever. Connected to a distal end of the lever portion 138 is one end of a rod 142, and the lever portion 138 and the rod 142 constitutes a crank. The other end of the rod 142 is connected to a rise-up motor 144, so that the torque of the rise-up motor 144 is transmitted to the lever portion 138 via the rod 142 as a reciprocally moving force, thereby reciprocally rotating the pivot shaft gear 128.

Meanwhile, secured to the pivot shaft 126 is one end of a lever 146 serving as a third lever. One end of a link 148 is connected to the other end of the lever 146. In addition, one end of a link 150 is connected to a distal end of the lever portion 140 of the lever 136. Both of the other ends of these links 148, 150 are connected to one end of the rod 52, and the other end of the rod 152 is further connected to the wiper motor 154. Consequently, the torque of the wiper motor 154 is adapted to be transmitted to the lever 146 and the lever portion 140 via the rod 152 and the links 148, 150. As shown in FIG. 8, the lever portions 140, lever 146, and links 148, 150 are provided with substantially the same lengths and are connected together in such a manner as to form a parallelogram. In addition, dimensions and the like of the respective parts are set in such a manner that, with the wiper motor 154 stopped, the link 148 and the rod 152 are aligned on a straight line and that the lever portion 140 becomes parallel therewith.

A description will now be given of the operation of this embodiment.

With the wiper apparatus 110 arranged as described above, with the wiper apparatus stopped, as shown in FIG. 11A, the lever portion 140, lever 146, and links 148, 150 are located in such a manner as to form a parallelogram as a whole, the link 148 and the rod 152 are aligned on a straight line, and the lever portion 140 is parallel therewith.

Here, during the normal operation of the wiper, the rise-up motor 144 is stopped, and only the wiper motor 154 is operated. Upon actuation of the wiper motor 154, its torque is transmitted to the link 154 via the rod 152 and to the lever 146 via the link 148. In this case, since the rise-up motor 144 is stopped, the lever portion 140 of the lever 136 is immovable. Accordingly, as shown in FIG. 11B, the link 150 and the lever 146 swing as they are in the mutually parallel state. Then, as shown in FIG. 11C, at a point of time when the wiper motor 154 has rotated a half revolution, the link 150 and the lever 146 are reversed, and this operation is subsequently repeated.

Upon the swinging of the lever 146, the pivot shaft 126 to which one end of the lever 146 is secured reciprocally rotates together with the case 116. In this state, since the lever 136 is stopped, the pivot shaft gear 128 to which this lever 136 is secured remains in a stopped state. Accordingly, the pivot shaft 126 rotates about the pivot shaft gear 128 together with the case 116. Concurrently, the intermediate gear 132 and the arm gear 122 both supported to the case 116 rotate, so that the torque of the pivot shaft 126 is transmitted to the arm gear 122 via the intermediate gear 132 at a predetermined ratio of the angle of rotation of the pivot shaft 126 (i.e., the gear ratio $\eta$ of the gear train 114 involving the pivot shaft gear 128, intermediate gear 132, and arm gear 122) and as the torque acting in the opposite direction.

As the arm gear 122 rotates, the wiper arm and blade 112 secured to the support shaft 124 supporting the arm gear 122 rotates in the opposite direction to the rotating direction of the gear train 114 (case 116). That is, as for the gear train 114, at the same time as the gear train 114 itself reciprocally rotates, the gear train 114 imparts torque acting in the opposite direction to its reciprocally rotating direction so as to reciprocally rotate the wiper arm and blade 112, so that the wiper arm and blade 112 and the gear train 114 (case 116) are relatively retracted and extended while undergoing reciprocal motion. As a result, the position at which the wiper arm and blade 112 is supported (rotating center), i.e, the position of the support shaft 124, is displaced, so that the apparent length of the wiper arm and blade 112 changes, thereby expanding the wiping range into, for instance, an elliptical shape.

Then, when it is desired to stop and accommodate the wiper arm and blade 112 by moving it further downwardly of its lower reversing position to a retracted position so as to accommodate the same in the cowl box (not shown) located below a lower end of the windshield, the wiper motor 154 is stopped and only the rise-up motor 144 is operated.

Upon actuation of the rise motor 144, as shown in FIG. 9, its torque is transmitted to the lever portion 138 of the lever 136 via the rod 142. Consequently, the lever 136 (lever portions 138, 140) rotate by an angle $\sigma$. As the lever portion 140 rotates, the link 150 moves by means of its torque. In this case, since the wiper motor 154 is stopped, the connecting position of the rod 152 with respect to the wiper motor 154 is immovable. Accordingly, as the lever portion 140 rotates, the lever 146 rotates by an angle $\beta$ via the inks 148, 150 with the lever 146 remaining parallel with the link 150.

Here, if the lever 146 rotates, the pivot shaft 126 to which one end of the lever 146 is secured rotates by the angle $\beta$ together with the case 116 (i.e., by the rise-up angle of the gear train 14) in the same way as described above, and torque oriented in the opposite direction is transmitted to the arm gear 122 via the intermediate gear 132.

Concurrently, the pivot shaft gear 128 to which the lever 136 is secured rotates by the angle $\sigma$ in the same direction as the rotating direction of the pivot shaft 126 (case 116) owing to the rotation of the lever 136. That is, the rotation of the pivot shaft 126 is reduced apparently. Hence, the oppositely oriented torque transmitted to the arm gear 122 due to the rotation of the pivot shaft 126 is finally transmitted by having the angle of rotation reduced.

Accordingly, even if the gear train 114 (case 116) rotates by a predetermined angle of rise (angle $\beta$), the angle of rotation of the wiper arm and blade 112 is reduced, and its moving range is diminished. In consequence, the wiper arm and blade 112 is stopped at a position in proximity to the end of the windshield, so that the wiper arm and blade 112 can be stored in a limited space.

Figure 10:
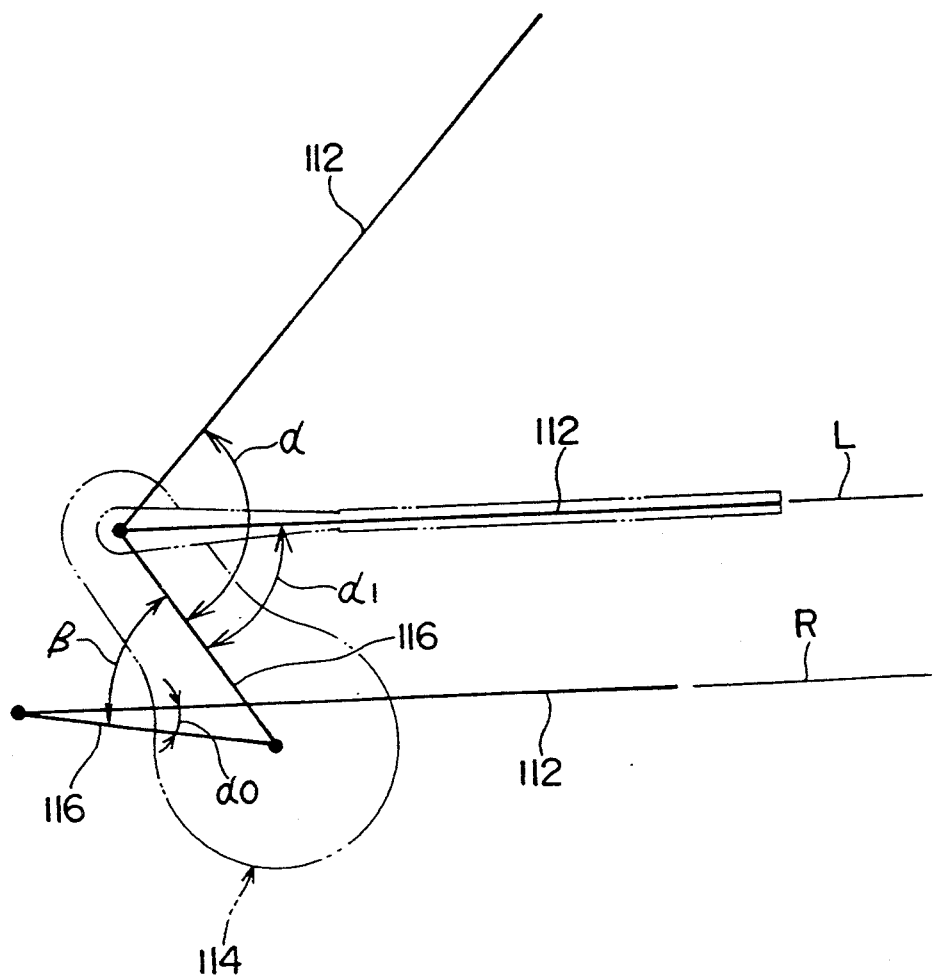
FIG. 10 is a diagrammatic view illustrating the operational relationship between a wiper arm and a gear train.

Here, an optimum angle of rotation, $\sigma$, of the pivot shaft gear 128 at the time of retraction of the wiper arm and blade can be calculated as follows:

Namely, if it is assumed, as shown in FIG. 10, that $\sigma$: optimum angle of rotation of the pivot shaft gear 128 at the time of retraction, $\alpha$: angle between the case 116 and the wiper arm 112

$\alpha_0$: angle between the case 116 and the wiper arm 112 at a retracted position, $\alpha_1$: angle between the case 116 and the wiper arm 112 at the lower reversing position, $\beta$: relative angle of the case 116 between the lower reversing position and the retracted position (i.e., the rise-up angle of the gear train 114), and $\eta$: gear ratio of the gear train 114, then, in order to store the wiper arm and blade 112 in an optimum state, it is preferred that the wiper arm and blade 112 at the lower reversing position (at the position of line L in FIG. FIG. 10) and the wiper arm and blade 112 at the retracted position (stored) position (at the position of line R in FIG. 10) be substantially parallel with each other.

Accordingly, the following formulae hold:

$$\alpha_1 = \alpha_0 + \beta \tag{1}$$

$$\alpha_0 = \alpha_1 - \beta \cdot \eta + \sigma \tag{2}$$

Hence, the following formula can be obtained from the above Formulae (1) and (2):

$$\sigma = \beta(1 - 1/\sigma) \tag{3}$$

Therefore, it suffices if the dimensions of the various parts including the lever 136 (lever portions 138, 140), lever 146, links 148, 150, and rod 152 are set in such a manner that the optimum angle of rotation, $\sigma$, of the pivot shaft gear 128 at the time of retraction of the wiper arm and blade satisfies Formula (3).

Thus, by setting the wiper arm and blade 112 at its lower reversing position and the wiper arm and blade 112 at its retracted position substantially parallel to each other, it is possible to store the wiper arm and blade 12 in a limited space without reducing a wiping range for the windshield. At the same time, the appearance of the windshield at the time when the wiper is stored is improved. In this case, a wiper arm and blade having a different wiper arm length can be accommodated in a limited space without being affected by the wiper arm length, so that the range of application of the apparatus can be expanded.

In cases where there is no need to set the wiper arm and blade 112 in a substantially parallel state at the retracted position, it suffices to set the angle of rotation, α, of the pivot shaft gear 128, as desired, and to set the dimensions of the levers 136, 146 and the like correspondingly. Thus, the amount of movement (angle of rotation) of the wiper arm and blade 112 at the time of their retraction can be set freely.

It should be noted that although the arrangement provided such that the intermediate gear 132 constituting the principal part of the planetary gear mechanism is employed as the means for transmitting torque in an opposite direction so as to transmit the torque to the arm gear 122, the present invention is not restricted to the same. For instance, an arrangement may be alternatively provided such that a chain or timing belt for connecting the pivot shaft gear 128 and the arm gear 122 is employed to transmit torque by reversing the direction of the torque and by reducing the angle by the use of such a chain or timing belt.

As described above, the windshield wiper apparatus for a vehicle in accordance with this embodiment offers an advantage in that, by virtue of its simple structure and low cost, the wiper arm and blade can be stored and stopped after being retracted, or the wiping range can be changed over between summer and winter.

What is claimed is:

1. A windshield wiper apparatus for a vehicle having a wiper motor, a first pivot shaft, a first wiper arm connected to said pivot shaft, a first link rod disposed between said motor and said first wiper arm for driving said first wiper arm during the operation of said wiper motor, and a first pivot lever having one end secured to said first pivot shaft and which undergoes a predetermined reciprocal rotation together with said first pivot shaft in response to movement of said first link rod in order to reciprocally rotate said first wiper arm, said windshield wiper apparatus for a vehicle comprising:
    a first link having one end connected to said first pivot shaft such that said first link is rotatable relative to said first pivot shaft;
    a second link having one end connected to a second end of said first pivot lever and having a second end connected to said first link rod;
    a third link having one end connected to a second end of said first link, wherein said second link and said first link rod are connected to said third link; and
    rotating means connected to said first link and being operative to rotate said first link to a predetermined wiping operating position and hold said first link in said wiping operation position during wiping operation of said windshield wiper apparatus, and being operative to rotate said first link about said first pivot shaft to a predetermined storage position whereby the windshield wiper apparatus is in a storage position.

2. A windshield wiper apparatus according to claim 1, further comprising:
    a crank arm disposed between said wiper motor and said first link rod and being rotatable in a predetermined direction by the operation of said wiper motor so as to cause said first link rod to move,
    wherein upon completion of a wiping operation of the windshield wiper apparatus, said first link rod and said crank arm are aligned along a substantially straight line.

3. A windshield vapor apparatus according to claim 1, further comprising:
    a second pivot lever;
    a second wiper arm which is interlocked to said second pivot lever through a second pivot shaft; and
    a second link rod having one end connected to said first pivot lever and said second link and having a second end connected to said second pivot lever for reciprocally rotating said second wiper arm,
    wherein said rotating means is operative to rotate said second wiper arm to a predetermined storage position in synchronism with said first wiper arm.

4. A windshield wiper apparatus according to claim 1, wherein said rotating means comprises a wire harness that may be manually operated to rotate said first link about said pivot shaft to said predetermined storage position.

5. A windshield wiper apparatus according to claim 1, wherein said rotating means comprises driving means for rotating said first link about said pivot shaft to said predetermined storage position.

6. A windshield wiper apparatus according to claim 1, further comprising:
    a driving arm secured to said pivot shaft for rotatably supporting said first wiper arm, said driving arm being adapted to reciprocally rotate integrally with said pivot shaft;
    a pivot shaft gear disposed coaxially with and rotatably relative to said pivot shaft; and
    means for transmitting torque in an opposite direction interconnecting a rotating shaft of said first wiper arm and said pivot shaft gear, said means for transmitting torque being adapted to transmit torque of said pivot shaft to said rotating shaft at a ratio of a predetermined angle of rotation of said pivot shaft and in an opposite direction,
    wherein said rotating shaft is displaceable about said pivot shaft so as to change the apparent length of said first wiper arm, thereby expanding the wiping range of a wiper blade connected to and supported by said first wiper arm.

7. A windshield wiper apparatus according to claim 6, wherein said rotating means is coupled to said pivot shaft gear and is operable to rotate said pivot shaft gear a predetermined amount thereby causing said pivot shaft to rotate in the same direction a correspondingly reduced amount and said means for transmitting torque to transmit the torque of said pivot shaft to said rotating shaft.

8. A windshield wiper apparatus according to claim 1, wherein said first link, said second link, said third link, and said first pivot lever are respectively connected in such a manner as to form a parallelogram.

9. A windshield wiper apparatus according to claim 1, wherein said second link and said first link rod are connected to the same portion of said third link.

10. A windshield wiper apparatus according to claim 1, wherein said second link and said first link rod are connected to different portions of said third link.

11. A windshield wiper apparatus for a vehicle having a wiper motor, a crank arm connected to said wiper motor, a pivot shaft, a first wiper arm connected to said pivot shaft, a first link rod connected to said crank arm such that during the operation of said wiper motor said first link rod moves a predetermined amount in response to rotation of said crank arm, and a first pivot lever having one end secured to said pivot shaft and which undergoes a predetermined reciprocal rotation together with said pivot shaft in response to movement of said first link rod said predetermined amount in order to reciprocally rotate said first wiper arm to cause a wiper blade connected to said first wiper arm to wipe a windshield of the vehicle, said windshield wiper apparatus for a vehicle comprising;
- a first link having one end connected to said pivot shaft such that said first link is rotatable relative to said pivot shaft;
- a second link having one end connected to a second end of said first pivot lever and having a second end connected to said first link rod so that said second link opposes said first link in a substantially parallel state therewith;
- a third link having one end connected to a second end of said first link, wherein said second link and said first link rod are connected to said third link; and
- rotating means connected to said first link and being operative to rotate said first link to a predetermined wiping operating position and hold said first link in said wiping operating position when said wiper motor is operative, and being operative to rotate said first link to a predetermined storage position about said pivot shaft to move said first wiper arm downwardly of a lower reversing position when said wiper motor is inoperative.

12. A windshield wiper apparatus according to claim 11, wherein upon completion of the operation of said wiper motor, said crank arm and said first link rod are aligned on a substantially straight line.

13. A windshield wiper apparatus according to claim 11, further comprising:
- a second wiper arm having a wiper blade; and
- a second link rod having one end connected to said first pivot lever and said second link, and having a second end connected to a second pivot lever connected to said second wiper arm for reciprocally rotating said second wiper arm,
- wherein when said wiper motor is inoperative, said rotating means is operative to rotate said second wiper arm downwardly of a lower reversing position in synchronism with said first wiper arm.

14. A windshield wiper apparatus according to claim 11, wherein said rotating means comprises a wire harness that may be manually operated to rotate said first link about said pivot shaft to said predetermined position.

15. A windshield wiper apparatus according to claim 11, wherein said rotating means comprises a storage motor for rotating said first link about said pivot shaft to said predetermined storage position.

16. A windshield wiper apparatus according to claim 11, further comprising:
- a driving arm secured to said pivot shaft for rotatably supporting said first wiper arm, said driving arm being adapted to reciprocally rotate integrally with said pivot shaft;
- a pivot shaft gear disposed coaxially with and rotatably relative to said pivot shaft; and
- means for transmitting torque in an opposite direction interconnecting a rotating shaft of said first wiper arm and said pivot gear, said means for transmitting torque being adapted to transmit torque of said pivot shaft at a predetermined angle of rotation and in an opposite direction,
- wherein said rotating shaft is displaceable about said pivot shaft so as to change the apparent length of said first wiper arm, thereby expanding the wiping range of said wiper blade.

17. A windshield wiper apparatus according to claim 16, wherein said means for transmitting torque comprises an intermediate gear which meshes with both said pivot shaft gear and a gear secured coaxially to said rotating shaft.

18. A windshield wiper apparatus according to claim 16, wherein said rotating means is coupled to said pivot shaft gear and is operable to rotate said pivot shaft gear a predetermined amount thereby causing said pivot shaft to rotate in the same direction a correspondingly reduced amount and said means for transmitting torque to transmit the torque of said pivot shaft to said rotating shaft.

19. A windshield wiper apparatus according to claim 11, wherein said first link has a lever portion connected to said rotating means.

20. A windshield wiper apparatus according to claim 11, wherein said second link and said first link rod are connected to the same portion of said third link so that said third link opposes said first pivot lever in a substantially parallel state therewith.

21. A windshield wiper apparatus according to claim 11, wherein said second link and said first link rod are connected to different portions of said third link.

* * * * *